United States Patent [19]

Esteban et al.

[11] 4,455,649
[45] Jun. 19, 1984

[54] METHOD AND APPARATUS FOR EFFICIENT STATISTICAL MULTIPLEXING OF VOICE AND DATA SIGNALS

[75] Inventors: Daniel J. Esteban; Gardner D. Jones, Jr.; Lee S. Rogers, all of Raleigh, N.C.

[73] Assignee: International Business Machines Corporation, Armonk, N.Y.

[21] Appl. No.: 339,592

[22] Filed: Jan. 15, 1982

[51] Int. Cl.³ .............................................. H04J 6/02
[52] U.S. Cl. .................................... 370/80; 370/118; 370/83; 381/31; 381/29
[58] Field of Search .................. 370/81, 79, 94, 43, 370/119, 80, 83, 118; 381/29-35

[56] References Cited

U.S. PATENT DOCUMENTS 4,237,552 12/1980 Aikoh et al. ............................ 370/83

OTHER PUBLICATIONS

Digital Coding of Speech in Sub-Bands–R. E. Crochiere et al., The Bell System Technical Journal, Oct. 1976.
Frequency Domain Coding of Speech–Jose Tribolet et al., IEEE 1979.
32 KBPS Ccitt Compatible Split Band Coding Scheme D. Esteban et al., IEEE 1978.

Primary Examiner—Robert L. Griffin
Assistant Examiner—Errol Chang
Attorney, Agent, or Firm—John B. Frisone

[57] ABSTRACT

The improved multiplexer described herein uses split band encoding across a plurality of input ports to increase the statistical advantage for compression gains but does not require a large number of input ports to achieve its advantage.

13 Claims, 14 Drawing Figures

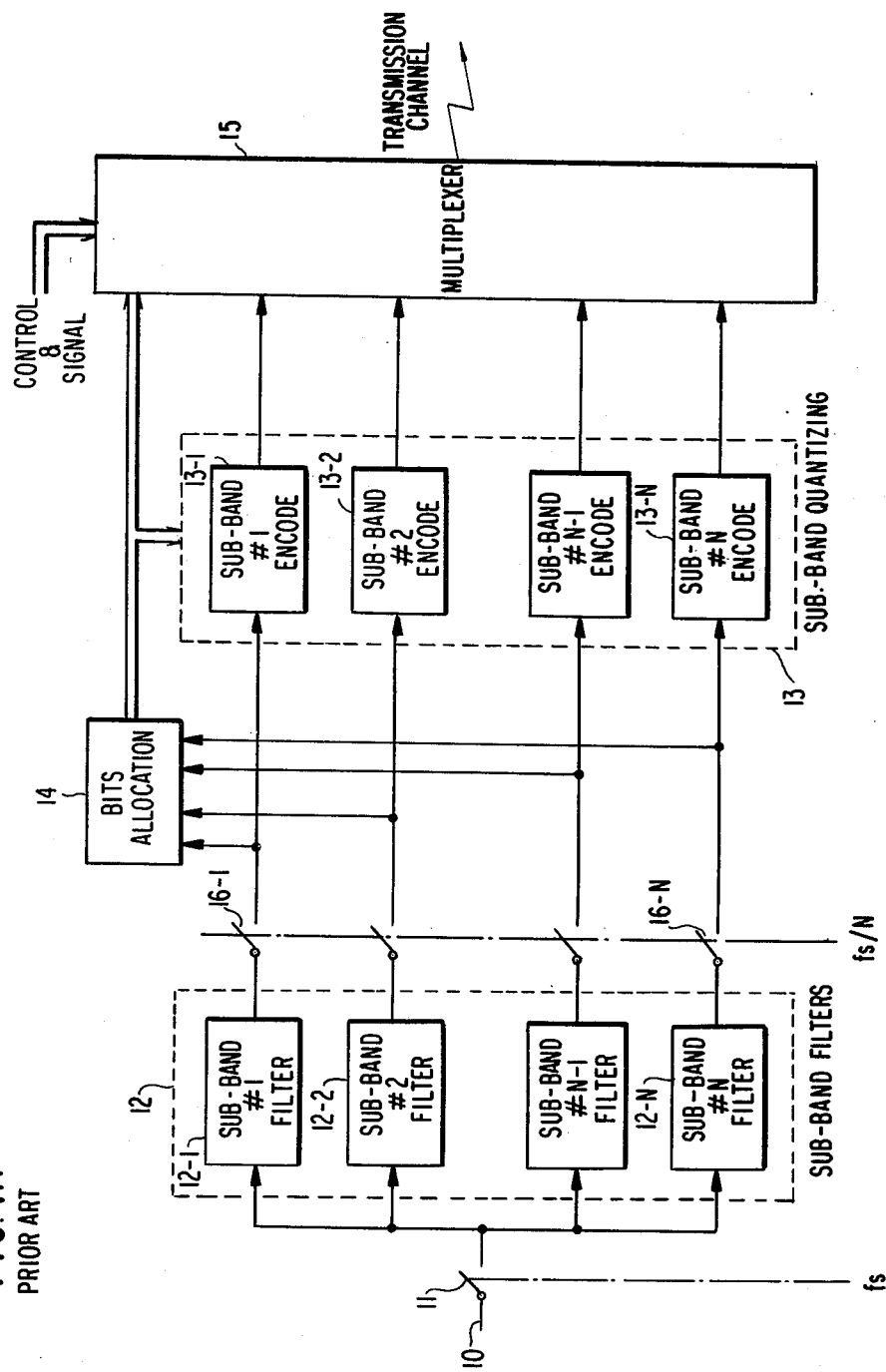
FIG. IA
PRIOR ART

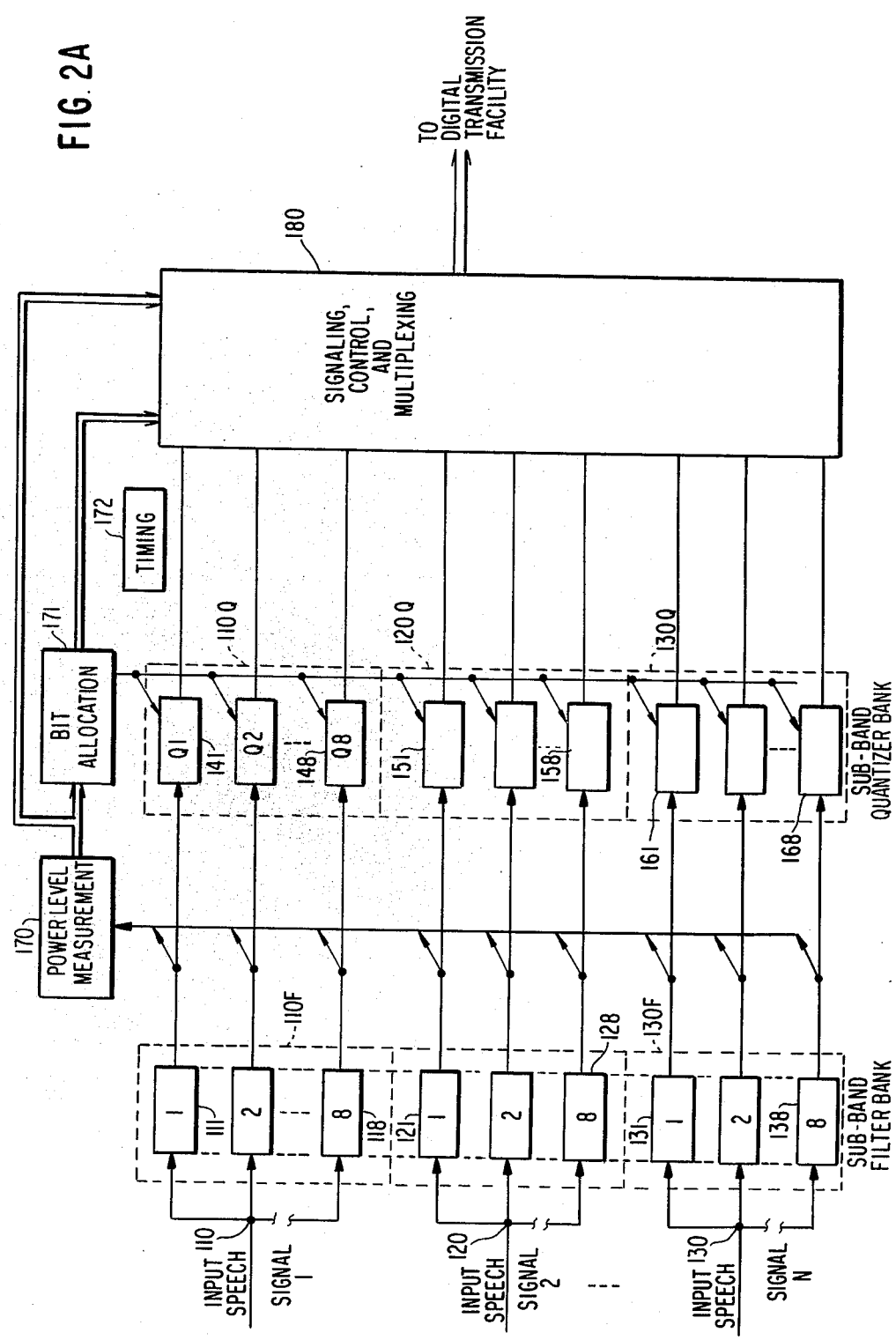

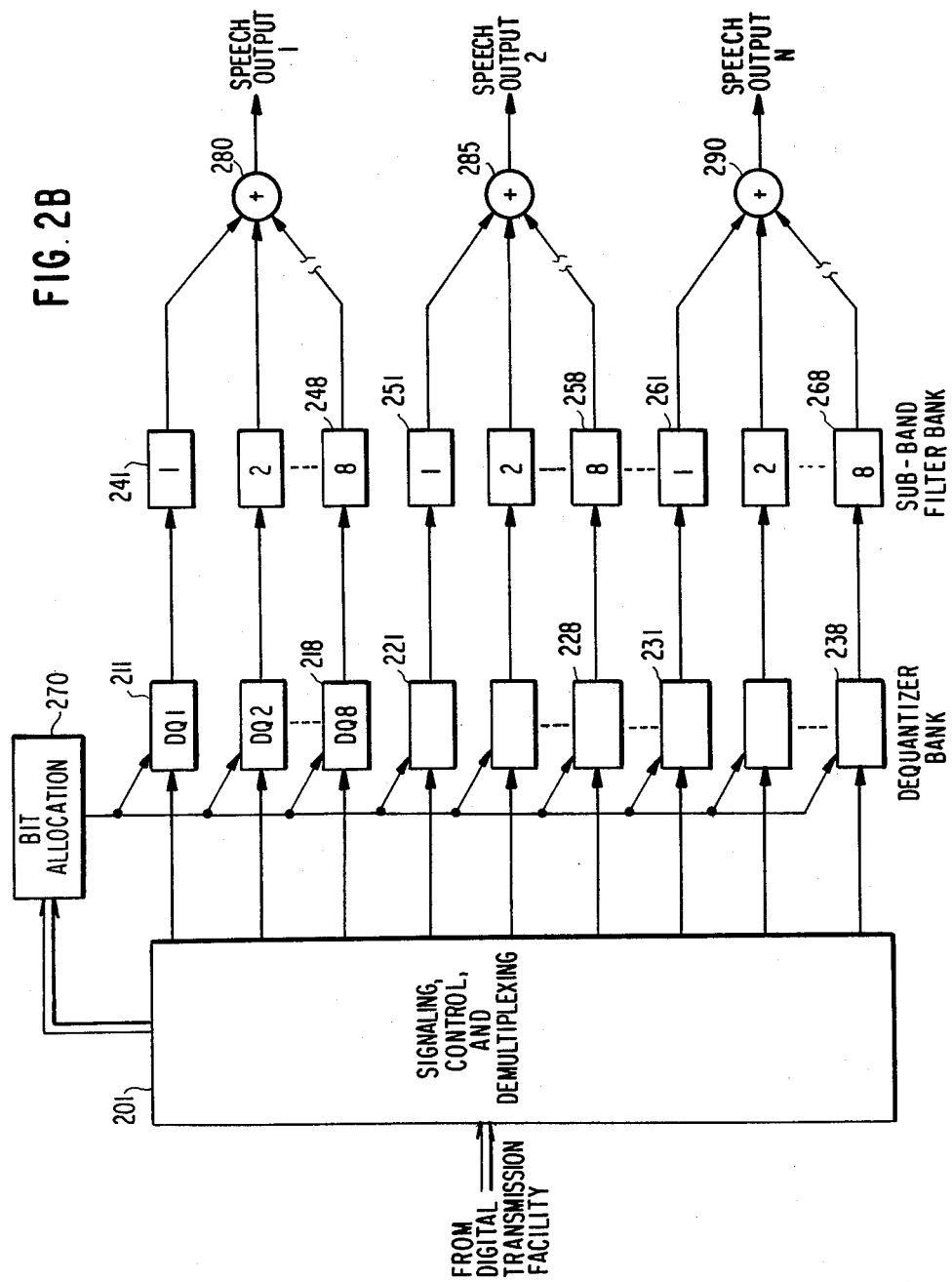

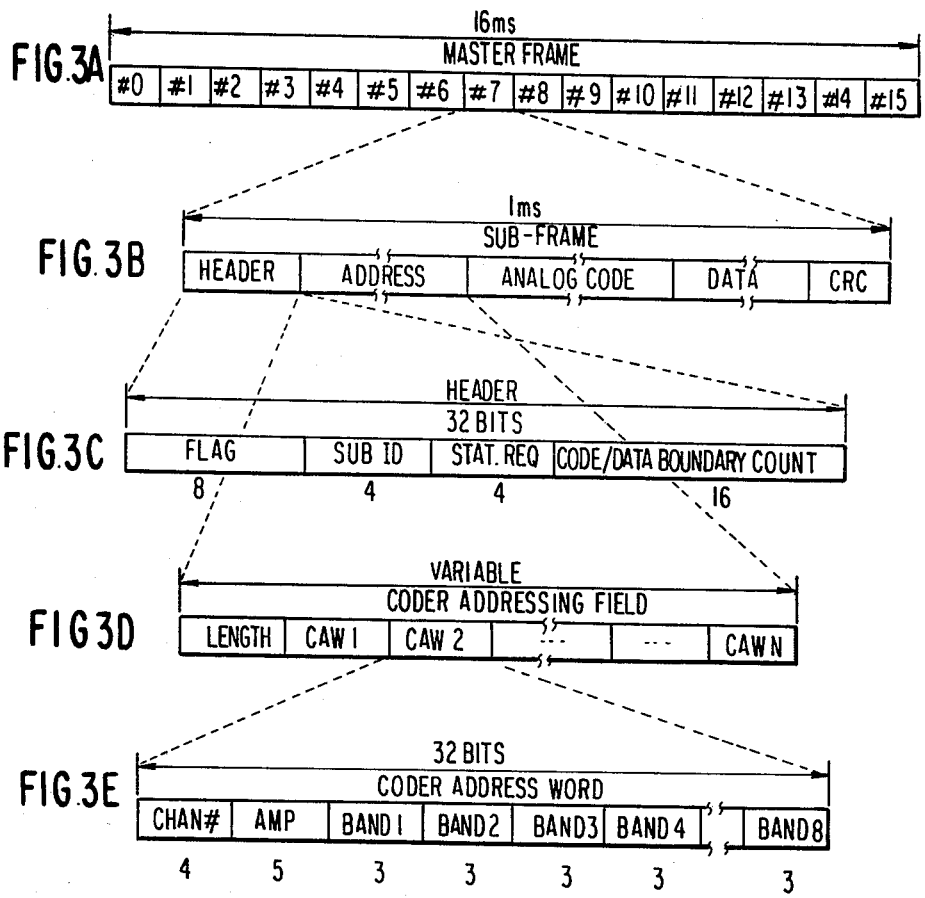

METHOD AND APPARATUS FOR EFFICIENT STATISTICAL MULTIPLEXING OF VOICE AND DATA SIGNALS

DESCRIPTION

1. Field of the Invention

The present invention relates to digital communications and is more particularly related to an improved method and apparatus for increasing efficiency in statistical multiplexers as applied to voice and data signals.

2. Background Art

The present invention relates to a method and apparatus for more efficiently using a communication link. The prior art evidences a number of approaches to increasing the efficiency with which a communication link is used to transmit signals representing speech. These improvements have been in large part based on the statistical properties of voice activity. Data shows that during an average two-way telephone conversation, for example, speech signal bursts are transmitted only 30–40% of the time. By selectively transmitting only those portions of a conversation in which speech occurs, the number of transmission channels required to serve a group of users can be reduced, or in other words the efficiency with which these transmission channels are used is increased. Three of the approaches described in the past are Time Assigned Speech Interpolation (TASI), Voice Activity Compression (VAC) and Digital Speech Interpolation (DSI).

In TASI transmission efficiency is achieved by using the average voice activity; compression gains in the range of 2–3:1 have been achieved. Each input port is repeatedly sampled and if the present sample does not differ from the prior sample, no transmission from that port is effected.

With TASI the number of input signal ports is 2 to 3 times the number of output transmission channels. Because these gains are achieved by using statistical averages, there is always a probability that an overflow condition will occur, that is a condition in which there are more active input ports than output transmission channels. A speech signal which is denied transmission is said to be "frozen out". This fact has two consequences, firstly the compression gains can be increased by increasing the number of input ports, and conversely there appears to be a threshold or a minimum number of input ports that must be present in order to achieve a sufficiently small probability of freeze out. For TASI and VAC, overflow results in discarding the speech segment; that is a viable approach when a relatively large number of input ports are being served. With a relatively large number of input ports, the freeze out time for a speech burst is rarely more than 10 milliseconds and does not noticeably degrade speech quality.

In DSI, overflow is handled by reducing the transmission rate assigned to all channels. For example using PCM transmission at 64 Kb/s (8 bits per sample, 8K samples per second), 64 Kb's are transmitted for each channel, when not overloaded. At the onset of overload, bit capacity for the new speech burst is obtained by reducing the number of bits per sample used for on-going speech signals. For example, if 50 speech bursts are being transmitted, each encoded using 8 bits per sample (i.e. 400 bits for all samples), 7 additional overflow channels can be obtained by reducing the bits per sample to 7, for all speech bursts being transmitted (i.e. 57 ports×7 bits/port=399 bits).

Other techniques in present use use variations of TASI and DSI. Many of these approaches are aimed at providing a reasonably low freeze out probability with modest number of input channels.

More recently, in U.S. Pat. No. 4,153,816 entitled "Time Assignment Speech Interpolation Communication Systems with Variable Delays," another approach to overflow is described which uses a variable delay in order to prevent overflow conditions and consequently freeze out. It has been reported that apparatus using this approach is capable of achieving a compression gain of 2, with only 32 input ports.

The present invention employs activity compression techniques as one component in a method and apparatus for providing reasonable compression gains with a relatively small number of input ports, an effect which was unavailable employing prior art techniques. The present invention achieves these advantages by employing split band encoding in a unique fashion.

Split band encoding is an encoding technique which splits the voice frequency band (typically 200 to 3,200 hertz) into a number of sub-bands (typically 4, 8 or 16). Each sub-band can then be sampled and quantized just as other digital coders sampled and quantized the entire voice frequency band. Split band encoding is described in, for example, "Digital Coding of Speech in Sub-bands" by Crochiere et al in the *Bell System Technical Journal*, Vol. 55, No. 8, pp. 1069 et seq (October, 1976) and "Frequency Domain Coding of Speech" by Tribolet et al appearing in the *IEEE Transactions on Acoustics, Speech and Signal Processing*, Vol. 2 ASSP-27, No. 5, pp. 512 et seq (October, 1979). A prime impetus for split band encoding is the reduction in coding rate achieved without noticeable degradation in signal quality. For example, Esteban et al in "32 KBPS CCITT Compatible Split Band Coding Scheme" in *Proceedings of the IEEE International Conference on Acoustics, Speech and Signal Processing*, pp. 320 et seq (1978) described a 32 KBPS coder which meets the specification recommended by the CCITT for a PCM channel operating at 64 Kb/s. Esteban et al proposed allocating a variable number of bits to code the signal in each sub-band based on the energy present in that band. This technique effectively combines the compression techniques used in DSI and TASI since bands with no energy (before a threshold) are not coded (a TASI or VAC approach) while bands with energy share the coding resource (a DSI approach).

As described in the referenced literature the split band encoder is comprised of a number of elements equal to the number of sub-bands into which the input signal is split. Each element effects a filtering function to isolate signals in its sub-band and quantizer for digitally encoding the output of the filter function.

The present invention is based on the recognition that during transmission of a voice signal, not all of the coding resources (bit capacity) are effectively used at all times. While the maximum requirement may be used in those cases where many frequency bands have significant energy, there are substantial time periods when few bands are energized and less than the maximum coding resource is needed. In accordance with the invention, the frequency bands from several speech signals are combined in a pool to more effectively use the total coding resource. Any residue coding resource not used by one signal, is employed by other signals. To illustrate with a numerical example, and assuming the use of 8 bands per signal, and as few as 10 input ports, a total of 80 speech sub-band signals will produce an effectively larger statistical base than would have been possible with only 10 input ports. To achieve this result the encoder or multiplexer must be capable of effectively allocating the coding resource or bit capacity in view of the signal constellation present in the different sub-bands, and this information is transmitted to the demultiplexer or decoder for decoding purposes.

In addition to effectively encoding speech signals, the increasing popularity of encrypted voice signals and voice frequency band modem renders it advantageous for a coder to have the capability of detecting signals which can not be effectively split band encoded, and bypassing the encoder for such signals.

With present day technology, the invention provides near transparent speech quality at an equivalent per signal rate of 8 Kb/s, assuming an activity compression gain of 2. In addition, and just as significant, is the fact that these gains are achieved with a small population of input ports, for example as little as 10, assuming 8 sub-bands per voice signal.

SUMMARY OF THE INVENTION

In respect of one aspect, the invention provides an effective statistical multiplexer capable of applying statistical multiplexing techniques with a relatively small population of input ports and still achieving compression gains based on the statistical nature of speech. A multiplexer or encoder for example includes a split band encoder for each of its ports. Each split band encoder includes a number of elements, each for encoding a voice sub-band. The sub-bands are arranged in the frequency domain so that the totality of the encoder elements serving a particular port provide for encoding in contiguous or near contiguous frequency bands spanning the entire voice frequency band. In order to achieve the statistical compression gains, a common control monitors each element in each of the split band encoders and allocates to each element a bit allocation determined by comparing an input to the element with a total of the inputs for all elements of all split band encoders coupled to all the input ports. In effect the statistical base of voice signals is multiplied by the number of elements in each split band encoder.

Accordingly, in one aspect the invention provides a statistical multiplexer including a plurality of input ports wherein each of said input ports has a split band encoder with a plurality of encoder elements, means for allocating to each element of each split band encoder a bit allocation determined by comparing an input to said element with a total of all said inputs for all elements of all split band encoders coupled to said input ports.

The means for providing the bit allocation is a common control means which responds to signals in each encoder element for allocating thereto a bit count capacity related to the input to the element in relation to the inputs to all elements of all said ports. The output of each encoder element is a quantized version of its input, quantized in a number of bits determined by the common control means. The output of the encoder elements are coupled to a multiplexer for concatenating the outputs of all the encoding elements.

Accordingly, in another aspect the invention provides a statistical multiplexer capable of operating with a relatively small number of input ports and exhibiting a relatively small freeze out factor for the number of input ports, comprising:

a split band encoder for each of said ports, each such encoder including a plurality of encoder elements for encoding each port's input in a bit length determined by a common control means, common control means responsive to signals in each said encoder element for allocating thereto a bit count capacity related to the input to said encoder element and the inputs to all said encoder elements of all said input ports, and multiplexing means for concatenating outputs of all said encoding elements.

In one specific embodiment of the invention, each encoder element includes a band pass filter defining the sub-band for that element, and in addition, a quantizer for each filter for quantizing the filter output in the form of a variable bit word. A common control means includes a bit allocation means separately responsive to each filter output for assessing the relative power level in each filter output versus the total power of all the filter outputs, and on the basis of that assessment, allocating none or some of the pool of bit capacity to each of the quantizers. A multiplexer then is responsive to the output of the quantizers for concatenating in time the quantized output of all the quantizers.

In accordance with this aspect, the invention provides a multi-port split band encoding digital multiplexer comprising:

a plurality of split band encoders, each associated with one of said ports, each said encoder comprising:

a plurality of m filters, where m is an integer greater than 1, each of said m filters with an input connected to the associated port, and an output, a plurality of m quantizers, each connected to a different one of said filter outputs, for quantizing said filter output in a variable bit word, and a common control means, common to all said ports and including:

bit allocation means separately responsive to each said filter output for assessing the relative power level of each filter output versus the total power of all said filter outputs, and on the basis of said assessment for allocating none or some of a pool of bit capacity to each of said quantizers, and multiplexing means for concatenating in time the quantized outputs of all said quantizers.

BRIEF DESCRIPTION OF THE DRAWINGS

The present invention will now be further described so as to enable those skilled in the art to make and use the same in the following portions of this specification when taken in conjunction with the attached drawings in which like reference characters identify identical apparatus and in which:

FIGS. 1A and 1B are block diagrams of prior art split band encoder and decoder, respectively;

FIGS. 2A and 2B are block diagrams of multi-port split band encoder and decoder in accordance with the invention;

FIGS. 3A–3E illustrate a typical frame format and components thereof;

DESCRIPTION OF PREFERRED EMBODIMENTS

Figure 1B:
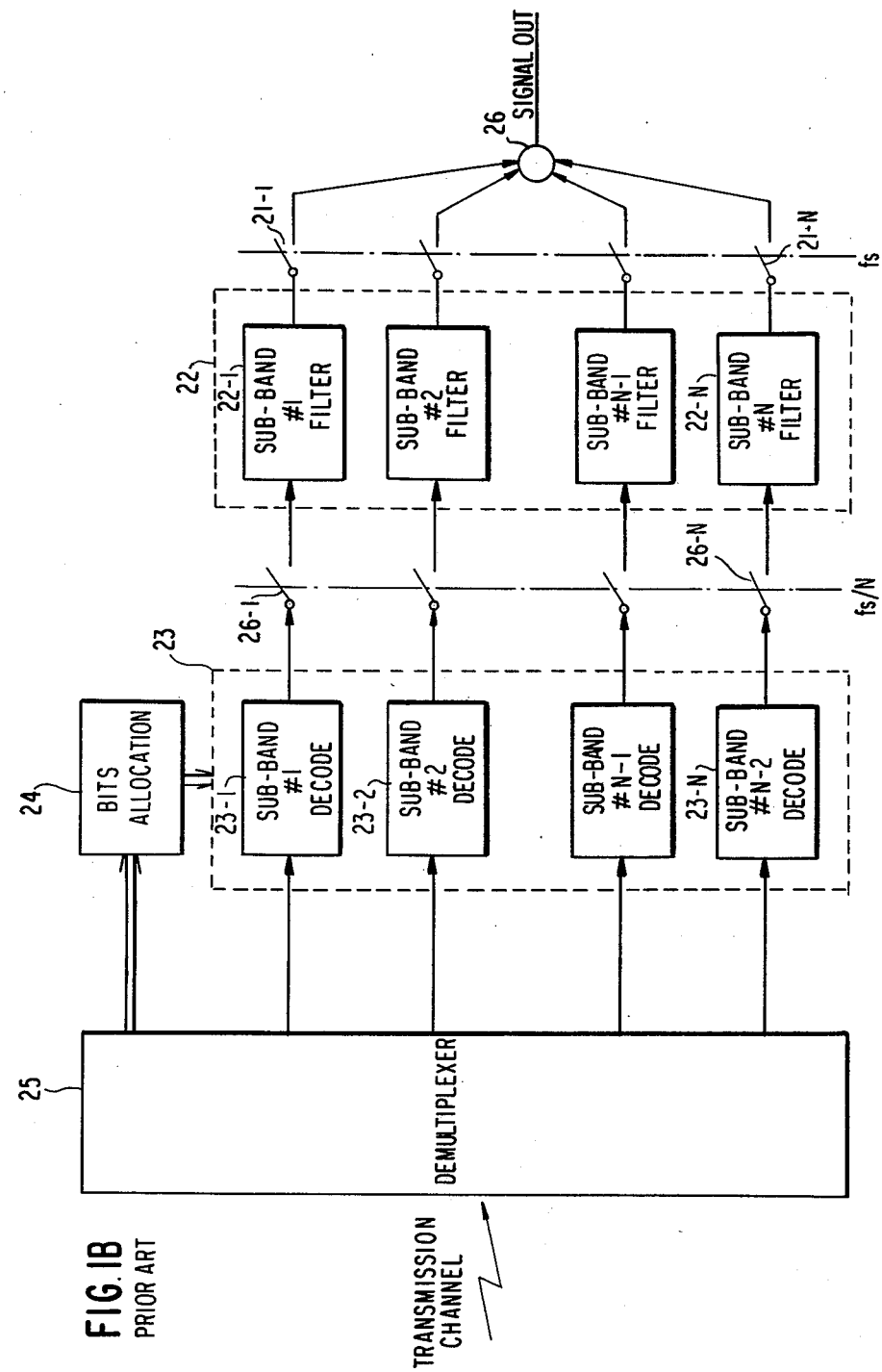

Before describing an illustrative embodiment of the present invention, reference is made to FIGS. 1A and 1B which illustrate, respectively, a prior art split band encoder and decoder.

As shown in FIG. 1A, an input port, at which is applied a voice frequency signal, is coupled through a sampling switch 11 and provided as an input to a composite filter unit 12 made up of a number of filters 12-1 through 12-N equal to the number of sub-bands to be employed. Each of the filters 12-1 through 12-N is a band pass filter, whose pass characteristics taken together span the voice frequency band; as described in the referenced publications, the pass bands may be contiguous or near contiguous. The filters may also down translate the frequency band passed, if desired, which allows sampling the filter output at a lower rate (fs/N vs. fs). The output of the filter bank 10 is applied through a plurality of sampling switches 15-1 through 15-N to a bit allocation device 14 and to a composite encoder or quantizer 13. The quantizer 13 includes a number of encoders, one for each sub-band. In addition, the bit allocation device 14 provides a control signal to each sub-band encoder, 13-1 through 13-N, indicating the bit capacity allocated to that encoder. Each of the encoders, in response to the input from the corresponding filter as well as the control signal indicating its allocated bit count, then encodes or quantizes the filter output in the corresponding bit count and provides the digital word (of variable bit count) as an input to the multiplexer 15. Multiplexer 15 then in response to each of these encoded words concatenates them in time and places them on a transmission channel.

Accordingly, the split band encoder can be seen as comprising a plurality of elements, each including an apparatus to sample the input in a specific frequency band, and device to encode the sample so produced. The sub-band encoder in addition includes common elements including the bit allocation device 14. The bit allocation device 14 monitors the signal in each of the sub-bands and based on a comparison between the signal in each specific sub-band to the signal averages over all the bands allocates, out of a pool of bit capacity, a bit count to each of the encoders or quantizers. In addition, the bit allocation device 14 provides information to the multiplexer 15 to indicate, in some fashion, the bit count allocated to each of the different sub-bands. This information is encoded by the multiplexer and transmitted along with the encoded input signal representations. This added or overhead information is used to decode the output of the multiplexer 15.

Reference to the Esteban et al publication will reveal that other apparatus can be arranged to provide split band encoding; however, the block diagram of FIG. 1A is a functionally accurate representation of any split band encoding apparatus and provides a clear illustration of the concept.

FIG. 1B is a block diagram of a corresponding split band decoder. The transmitted signal is input to the demultiplexer 25 which provides a plurality of parallel outputs to a bank of decoders or dequantizers 23, including a different decoder or dequantizer for each sub-band or element; and accordingly decoders 23-1 through 23-N are illustrated. A different output of the demultiplexer 25 corresponds to the control or overhead information, and this is input to the bit allocation device 24. The bit allocation device 24 determines from the overhead information the bit count in each sub-band or element, and provides an input to the bank of decoders 23 indicating to each of the sub-band decoders the corresponding bit count. In addition, each of the decoders 23-1 through 23-N, based on this control input can isolate, in the multiplexed data stream that word corresponding to the encoded output of the corresponding encoder.

With this information, each sub-band decoder reconstructs a digital sample of the signal originally encoded by its corresponding sub-band encoder. The output of each sub-band decoder is coupled through a sampling switch 26-1 through 26-N to a bank of filters 22, including a sub-band filter for each encoder element; i.e. sub-band filters 22-1 through 22-N. The sub-band filters merely smooth the analog samples. A further sampling switch 22-1 through 21-N is provided for each sub-band filter to couple the filter output to a summing device 26. The output of the summing device 26 is a reconstructed version of the voice signal originally input at the port 10. While reference to the Esteban article indicates that sub-band decoders different in architecture from that shown in FIG. 1B can be constructed, FIG. 1B is an accurate functional representation of a sub-band decoder and provides a readily understood illustration of the concepts used in the sub-band decoding process.

FIG. 2A is a block diagram of a statistical multiplexer employing split band encoding in accordance with the present invention. As is shown, a plurality of input ports labelled input speech signal 1 (110) through input speech signal N (130) are provided as inputs to the multiplexer. A split band encoder is provided for each of the ports; accordingly, each port has associated with it, in a sub-band filter bank, a sub-bank of filters and in a sub-band quantizer bank, a sub-bank of quantizers. More particularly, taking port 1 (110) for example, a sub-bank 110F comprising filters 111 through 118 provides for segregating the input frequency band into 8 sub-bands. The pass band of these filters can provide for contiguous or nearly contiguous coverage of the entire voice frequency band. Each filter provides an output to an associated quantizer in the sub-bank 110Q of quantizers associated with the port. Accordingly, each of filters 111 through 118 has an associated quantizer 141 through 148.

Each of the other ports 120 through 130 (representing two additional exemplary ports out of a total of N ports) is coupled to a sub-bank of filters which in turn is connected to an associated sub-bank of quantizers. Quantizers capable of quantizing within an allocated bit capacity are known and therefore need not be described. The sub-band filters are implemented as transversal filters in a signal processor or speech processor. Transversal filters are a standard digital filter configuration common in the literature. The response of such filters for a given sampling rate is determined by the number of taps or data points used in the filter and the coefficients or weighing associated with each tap. Filters have been described in detail in the literature which are suitable for implementing the sub-band filters. An example is; "A filter Family Designed for Use in Quadrature Mirror Filter Band" by J. D. Johnson, page 291, Proceedings of *IEEE International Conference on Acoustics, Speech and Signal Processing* (1980).

However, in contrast to the prior art, the common equipment (common to all the input ports) assigns the coding resource or bit capacity of the multiplexer across all the ports, rather than only within a single port. To this end, the common equipment includes a power level measurement device 170 which is separately responsive to the output of each of the filters in the entire sub-band filter bank. The power level measurement device 170 provides an output to a signalling control and multiplexing equipment 180 as well as to a bit allocation device 171. The bit allocation device 171 provides a control signal to each of the quantizers in the entire quantizer bank (covering all N input ports) providing to each of the quantizers a bit allocation out of the pool of bit capacity for the entire multiplexer. The bit allocation device 171 provides a second input to the signalling, control and multiplexing equipment 180. Finally, the common equipment includes a timing sub-system 172 to distribute timing signals to all the elements shown in FIG. 2A, part of the function of the timing signals effects the function of the sampling switches shown in FIG. 1A.

The operation of the apparatus shown in FIG. 2A should be apparent, each split band encoder is comprised of a number of elements (eight as shown in FIG. 2A), each element includes a filter and quantizer. These elements divide the signal frequency spectrum into several sub-bands (eight is a representative number). Each of the sub-bands is sampled, through the filter and timing unit 172 at its Nyquist rate such that the sum of the number of samples is equal to the sampling rate that would have been applied to the total spectrum (typically greater than 2f samples per second where f equals the highest frequency in the original signal). The signal in each band is coded or quantized by the quantizer into a variable number of bits (0 to 7 for example) depending on the relationship of the power in the individual band to the power in all other bands, across all the ports.

The prior art includes procedures or algorithms for allocating or assigning bits to the various sub-bands of the different ports or signals of a split band coder. For example, the general procedures described in "Block Quantization of Correlated Gaussian Random Variables" by Haunf et al appearing in *IEEE Transactions on Communication Systems*, pp. 289 (September, 1963), could be used. A more specific practical implementation in given in Section V, "Bit Assignment and Quantization" of "Real Time Simulation of Adaptive Transform Coding" by Cox et al appearing in the *IEEE Transactions on Acoustics, Speech, and Signal Processing*, April, 1981, pp. 147 et seq.

The present invention, in contrast, however requires allocation of bit capacity over all sub-bands included in a plurality of speech signals or ports. This is effected, in the bit allocation device 171 by first allocating total bit capacity to be assigned among the different channels or ports or signals. For such allocation to be effective, however, some preprocessing of the various input signals is required, i.e. to ensure that the various signals are normalized to relative power levels such that the signal powers have close to the same long term averages in each of the ports. Once bit capacity has been assigned to each of the channels, the same technique is then used to assign the bit capacity among the various sub-bands in a given channel or port.

Figure 6:
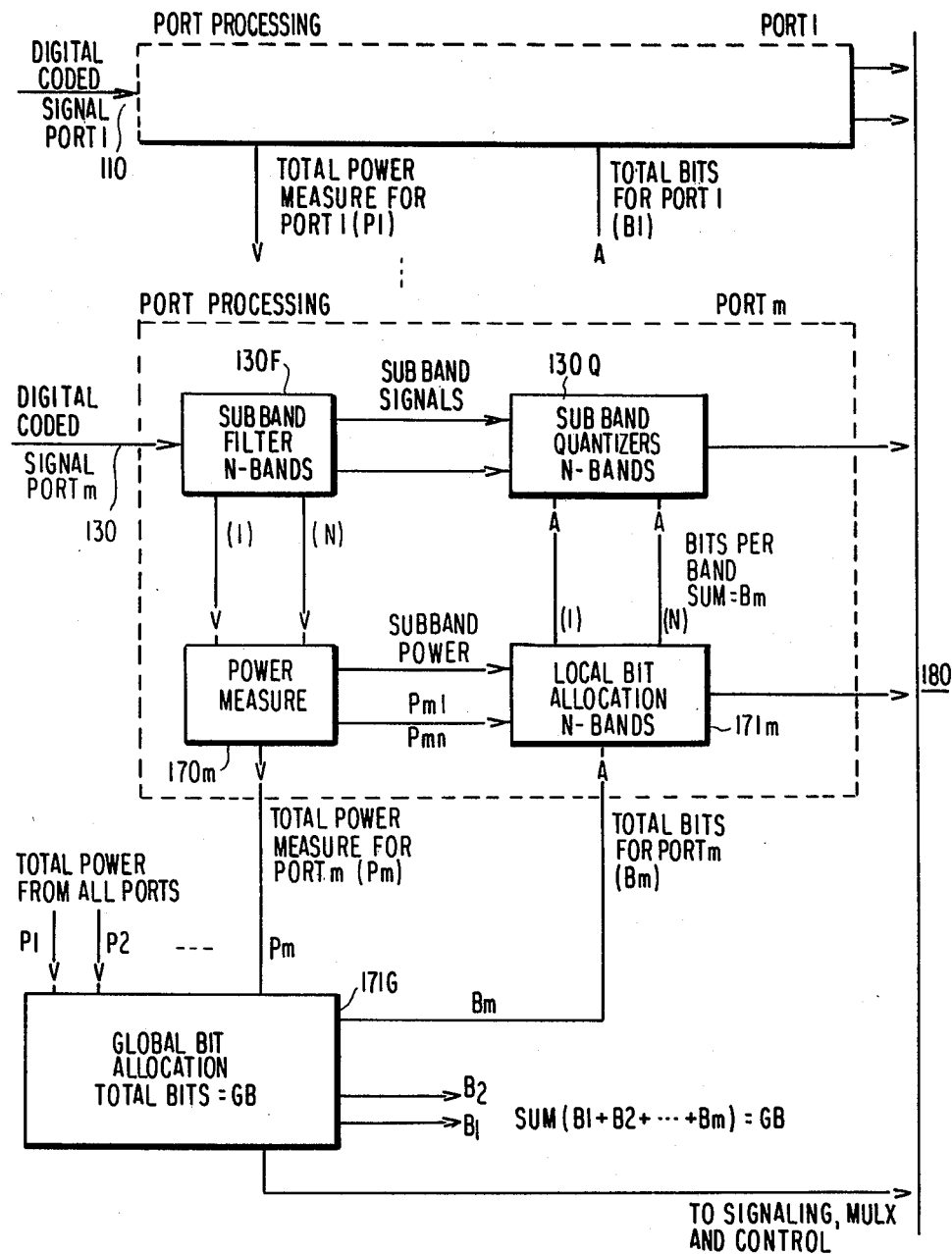
FIG. 6 is a block diagram of a typical port and the global bit allocation for each sub-band of each port.

To illustrate the bit allocation processing in more detail, reference is made to FIG. 6 which illustrates this processing in detail. As shown in FIG. 6, an encoder with m ports effects bit allocation in two stages. First global bit allocation is effected in global bit allocator 171G based on power level signals P1–PM. The resulting port-bit allocation signals B1–Bm are then used to divide up each port-bit allocation among the sub-bands. Finally, at a typical port m, each sub-band bit allocation Bm1–Bm8 (for eight sub-bands) is coupled back to the associated quantizers 130Q for use. These two allocations, global and local, use the same algorithm. In each case, the assignment is based on some power measures taken over the processing block (16 ms.). In the specific implementation to be used, the power measure is approximated to be proportional to the peak or the maximum value of the signal taken over the processing block. Both the global and local bit allocations use signal peaks as the base parameter in establishing coding requirement. In the case of the global allocation, the Total Power Measure for a given port (Pm) is taken to be the sum of the peak signals in the filter bands of that port. The bit allocation algorithm is now described in connection with FIG. 7.

In connection with this description of the bit allocation processing, we generically call:

N: the number of bands
B: the total bit capacity
b(k): the number of bits used to quantize the kth band
nb: the maximum number of bits to be assigned to any band
S(k): the peak amplitude signal in the kth band in any frame The basic bit assignment algorithm is:

$$b(k) = |\text{Log}|S(k) - C$$

where Log is taken to the base 2 and C is a constant. The processing proceeds by estimating the value of c in two steps. First, compute the bit assignment, and then reassign bits if the total allocation is different from B by:

(a) deleting bit allocation from sub-bands starting with those assigned the largest bit capacity, or
(b) adding bit capacity to sub-bands starting with sub-bands assigned the smallest bit capacity.

In applying the foregoing to allocation within a port, we specifically call:

N: number of sub-bands per port
B = Bm: total bit capacity per port m
b(k): bit capacity allocated to kth sub-band
nb: maximum bit capacity per sub-band
S(k): peak signal amplitude in kth sub-band over a frame In applying the algorithm to global bit allocation, we specifically call:

N = M: number of ports
N = GB: total bit capacity per frame
b(k) = Bm: total bit capacity allocated to port m
nb = NB: maximum bit capacity to be assigned to a port
S(k) = Pm: total peak amplitude signal at port m (peak amplitude of each sub-band, summed)

Figure 7:
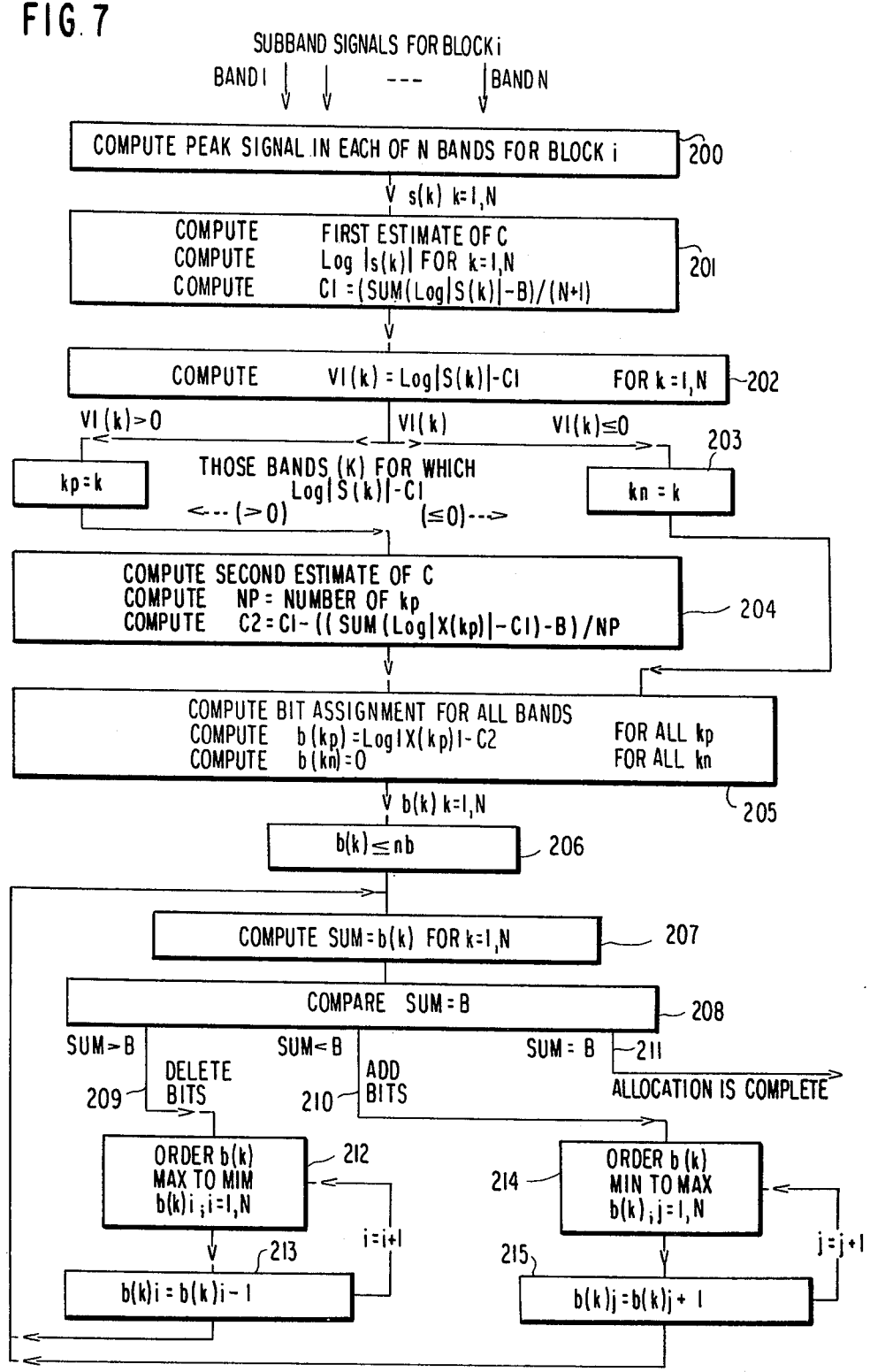
FIG. 7 is a flow diagram illustrating the algorithm used for bit allocation.

The generic algorithm flow is shown in FIG. 7. This is processed first by 171G for global bit allocation, then 171, 1–m for sub-band bit allocation. Referring to FIG. 7, function 200 computes peak signal amplitude in each of the ports. For global bit allocation we use total (summed) peak signal amplitude in each sub-band. After computing (in function 201) |Log| (Pk) for k = 1 to m we compute a first estimate C1 for C as shown. Within this estimate, we compute a first estimate of bit allocation per port for ports 1 to m, in function 202. Function 203 separates ports requiring bit allocation from others. Function 204 refines the estimate C2 of C based on the number of ports requiring bit capacity.

Function 205 then, based on the latest estimate C2 computes bit capacity for each port. Function 206 ensures that each such capacity request is below the maximum NB. Function 207 sums all tentative allocations and function 208 compares the sum to GB. The logic then proceeds via path 209, 210 or 211 depending on the relation determined at function 208. Path 209 indicates excess bit allocation. In that event, function 212 orders the allocations from highest to lowest. Function 213 decrements one bit from the port allocated the highest bit count, the iteration counter i is incremented, and the loop 207, 208, 212, 213 is re-entered at function 207. The loop is repeatedly traced until path 211 is exited.

If path 210 is taken, function 214 is effected to order bit allocation from minimum to maximum. Function 215 increments the smallest allocation, the iteration counter i is incremented and the loop 207, 208 214, 215 is re-entered at function 207. This loop continues to increment one bit of allocation once per pass until path 211 is exited. At this point, each port capacity B1 through Bm has been determined.

The signals B1 through Bm are provided to the local bit allocators 171-1 through 171-m and the algorithm is repeated to effect local bit allocation. Although FIG. 6 shows a common global bit allocation 171G and local bit allocators 171m, it should be apparent that the entire bit allocation would be effected in common equipment as shown in FIG. 2A, if desired. The functions of the flow diagram (FIG. 7) can be implemented in several commercially available Signal Processors and in some high performance microprocessors. In addition, the algorithm of FIG. 7 is but one of a number of techniques for determining bit allocation; for another technique see Croisier et al, U.S. Pat. No. 4,142,071 entitled "Quantizing Process with Dynamic Allocation of the Available Bit Resource and Device for Implementing said Process" assigned to the assignee of this application.

To assist in proper demultiplexing, additional information is transmitted along with the quantized outputs of the various elements, that information relates to which sub-bands of which ports have been transmitted (because the signal presented at the port, in the sub-band, represented an active input) and how many bits were allocated to the particular sub-band.

Typical voice signal characteristics indicate that bit allocation need occur no faster than once every 15 or 16 milliseconds, thus a processing block or frame is 16 ms. Although freeze out is still a possibility, and is therefore associated with some probability, the invention obtains an advantage by the statistical nature of the coder outputs. That is, more particularly, considering each sub-band as a circuit or channel, the probability that all sub-bands in a particular port will be utilized at any one time is less than 1, this unused capacity from one port can be used to assist in reducing the probability of freeze out for other ports.

Although FIG. 2A shows inputs only from speech signals, depending upon the number of ports connected to the multiplexer, there may be significant probability of unused capacity; this capacity can be employed for packet transmission of data which is amenable to variable delays, as is described in connection with FIGS. 4 and 5.

Some signals that are transmitted over voice frequency channels have characteristics widely different from the typical voice frequency; an example of such signal is encrypted 64 Kb/s PCM voice. The encryption process changes the signal characteristics. Presenting this signal to a lower rate coder would destroy the encrypted information. This is for the reason that this type of signal appears to contain energy distributed equally over most or all of the sub-bands. To effectively handle signals like this, the power level measurement means 170 or other common control equipment monitoring the outputs of all the filter components to a particular port, detects such a characteristic and switches the input from that port to bypass the split band encoder. Although this significantly increases the data rate out of the coder, a small number of such circuits out of a much larger population could be allowed, to reduce the average bit rate from a circuit to within reasonable bound.

Figure 8:
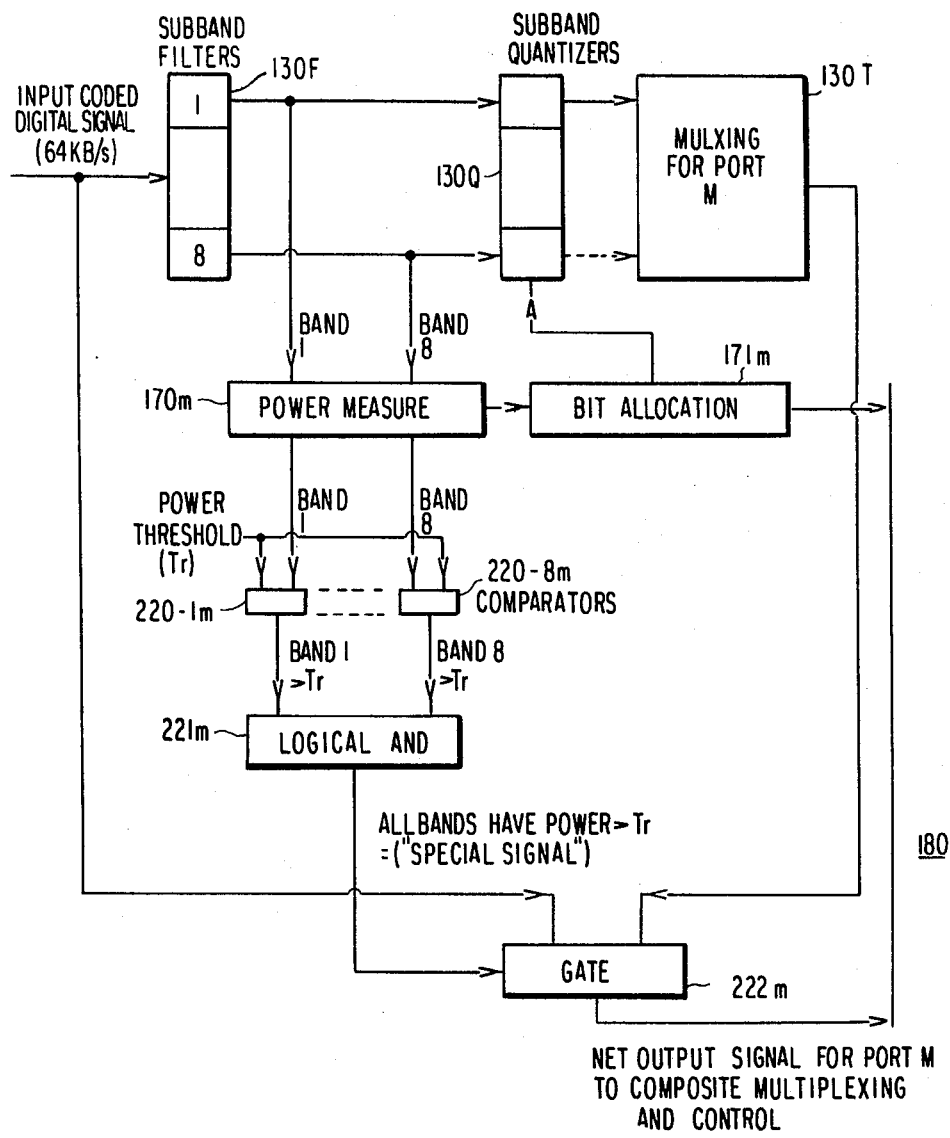
FIG. 8 is a block diagram of a typical port illustrating equipment to allow bypassing the split-band encoder by special signals.

FIG. 8 is an example of apparatus to detect the presence of such special signals and to bypass the split-band encoding. FIG. 8 shows a typical port and includes in addition to the sub-band filter bank 130F and sub-band quantizer bank 130Q, power measurement 170m and bit allocation device 171m, a plurality of comparators 220-1m through 220-8m (for eight sub-bands per port), an AND gate 221m with an input from each of the comparators 220-1m through 220-8m and a signal gate 222m controlled by AND gate 221, and passing either the split-band encoded output of mulx 130T or the port input signal to the multiplexing signal and control 180. The power in each band is measured as part of the normal bit allocation procedure via power measurement device 170m and a power measured signal is produced for each sub-band. In addition, these power signals are each compared to a threshold Tr. If all (8) of the thresholds are exceeded, the digital input signal is used directly as the output signal for that port. In the specific implementation of FIG. 8, the power measure signal in a band is approximated to be proportional to the peak signal amplitude in that band for a given block of samples, a block being 16 ms.

From the preceding description, the manner in which encrypted voice or oher special signals may bypass the split-band encoding via gate 222m should be apparent. The use of a mulx 130T allows this to be implemented with a single gate 222m per port. However, by eliminating mulx 130T the same effect could be produced at the expense of providing a gate 222 for each sub-band in each port.

Alternatively, special trunks, accessed by a dialed prefix can be provided to bypass split-band encoding. When sending special signals such as encrypted voice, dialing the prefix accesses one of these trunks to bypass the split-band encoding.

As described above, since the natural envelope of a voice signal is approximately 16 milliseconds in duration, the signalling, control and multiplexing equipment 180 transmits information provided by the plurality of quantizers, in a frame format in which 16 frames are sent without changing the addressing, each of the frames having a duration of 1 millisecond; accordingly the master frame is 16 milliseconds in duration. In other words, the power level measurement 170 and bit allocation device 171 can change the bit allocation once every master frame (16 milliseconds).

The make up of the master frame is shown in FIGS. 3A through 3E, wherein FIG. 3A illustrates the master frame as comprising a total of 16 frames. FIG. 3B illustrates the format of a typical frame as including a header field, address field, analog code field (the quantized output of the split band encoding elements), and finally a data field which can be used to fill any unused time in the frame. The frame concludes with a CRC word (cyclic redundancy check) for data protection.

The header field itself is shown in detail in FIG. 3C, and includes a flag, a frame ID number, a status request field which can be used for signalling between multiplexer and demultiplexer, and a code/data boundary count field which locates, in bit count, the boundary between the analog code field of the frame and the data field. The flag byte is selected so that it is sufficiently unique to be identified in the data stream using statistical techniques. Since the flag byte occurs in each header, it occurs once per millisecond. The combination of the header and the frame count field provides sufficient information for the demultiplexer to attain and hold frame synchronization; that is, to be able to identify the beginning of each different frame.

The address field of each frame is shown in more detail in FIG. 3D. The total length of the address field is variable, for reasons which will appear hereinafter. The address field includes a number of Coder Address Words (CAW). Since the master frame is 16 frames long, 1/6th of the set of split band encoders or ports can transmit a CAW in each frame; that is, 1/16th of all the split band encoders will be allowed to transmit per frame. However, transmission of the CAW will be effected only in the CAW word differs from a word which has immediately previously been transmitted for that port. Accordingly, once a coder address word is transmitted, no further coder address words will be transmitted from that split band encoder until the word is changed. Since provision is made for transmission of all coder address words, to the extent that the coder address words are not transmitted, because for example they have not changed, the coder addressing field will be shorter than nominal. As shown in FIG. 3D, the coder address field includes a length field in addition to the plurality of CAW words which are transmitted in that frame. The length field indicates the number of coder address words in the frame.

FIG. 3E illustrates a typical coder address word. The first field in the coder address word is the channel number (4 bits long). These 4 bits allow identification of up to 16 different coder address words per frame. In combination with 16 frames per master frame, 256 port capacity is provided for. Of course, if less than 256 ports are connected (say 16 ports) then only one CAW word need be provided for per frame.

Referring back to FIG. 3B, the analog code field follows the address field. The number of bits into which the quantized output is coded varies as indicated in the coder address word. Each coder can contribute from 0 as 64 bits (0 to 7 bits for 8 channels). Typically, a voice signal will use 14 or less bits when active, and no bits during pauses.

The channel # field is followed by 5 bits of amplitude information for the channel (or port). Each sub-band then has 3 bits within which to indicate the bit count for the sub-band.

As shown in FIG. 3B, the data field is that portion of the frame not occupied by the preceding fields. This field is used to transmit data traffic from a deferable pool, for example data packets.

Finally, the frame ends with a CRC, 16 bits cyclic redundancy check word. This check word is based on all information in the frame. While a CRC (or any other redundancy check) is optional, it is preferred for well-known reasons.

The status and request field (in the header-FIG. 3C) is used to implement link controls. This can be used, for example, to communicate from one station to a remote multiplexer that its signal is being received and frame synchronization has been achieved.

Various modifications can be made to the exemplary signal format shown in FIGS. 3A–3E. For example, while FIG. 3D shows provision for 16 CAW words per address field representing the number of ports divided by the number of frames per master frame, that is not at all essential since the probability of all ports sending address words in the same master frame is very small. For example, we could transmit 8 or 10 coder address words per frame (i.e. less than the ratio of ports to frames per master frame) with little probability that a coder with a new address information will not be able to send it. Any coder with a new address information which has not been transmitted could for example be placed in a high priority queue to be serviced in the next master frame.

In addition, further reductions can be made in the coder address word by adding a word with bits equal to the number of bands following the channel field (since this word is three bits long—indicating bands 1–8) since the coder would be likely changing less than 6 bands the overall number of bits in the coder address word would be reduced.

FIG. 2B is a block diagram of a corresponding decoder. As shown in FIG. 2B, the decoder includes a signalling, control and demultiplexer 201, a bit allocation device 270, and a split band decoder for each output port. It is the function of the decoder to recreate the initial speech input signals in response to the digital information provided from the digital transmission facility to which had been applied the output of the encoder of FIG. 2A. The signalling control and demultiplexing equipment 201 synchronizes to the frame rate to allow it to identify, as a distinct entity, each different frame. The ID field in the frame header identifies which particular frame is received and can be used for gating the coder address field and the following analog code to appropriate output ports. The contents of the coder address field are coupled via the bit allocation device 270 to appropriate ones of the dequantizers in the dequantizer bank. Each output port is associated with a sub-bank of dequantizers, equal in number to the number of bands in the split band encoding employed. Accordingly, for the assumed 8 band process described herein as exemplary, each output port is associated with 8 different dequantizers. The coder address word includes both channel number and bit length for each dequantizer. The combination of frame ID and channel number identifies a particular output port. The coder address word includes a 3-bit quantity for each dequantizer which is coupled via the bit allocation device to the appropriate dequantizer. The signalling control and dumultiplexing equipment 201 couples appropriate portions of the analog code field to the appropriate dequantizer. The information necessary to determine which bits of the analog code field are appropriate to which dequantizer is contained in the coder address field. For example, if the coder address word 1 indicates that a total of 10 bits are employed for the output port identified by header ID and channel number, then the first 10 bits of the analog code field are applied to the dequantizers for the associated output port. Furthermore, the coder address word identifies exactly how those 10 bits are distributed among the 8 dequantizers, and thus the gating effected by the signalling control and demultiplexing equipment 201 is directed by the coder address word. In this fashion, the bits included in the analog code field are distributed among all the dequantizers. In addition, by supplying to each dequantizer the amplitude portion of the coder address word, the scale factor represented by the number of bits provided from the signalling control and demultiplexing equipment 201 is determined. In this fashion, each dequantizer converts a multi-bit digital input into an analog level.

Associated with each dequantizer is a particular filter in a filter bank. The filter bank is broken up into a number of sub-banks equal to the number of output ports, and each filter has a pass band corresponding to its allocated portion of the frequency spectrum. Accordingly, the analog outputs from the dequantizers are filtered by the associated filter. Each sub-bank of filters provides an output to a common summing device, so that each output port has a single summing device, and for ports 1, 2 and N shown in FIG. 2B, summers 280, 285 and 290 are illustrated, each having an input from all filters in the associated sub-bank of filters.

The dequantizing and filtering functions are mirror images of the FIG. 2A processes and thus need not be further described.

From the foregoing description, it should be apparent to those skilled in the art how the data represented in FIGS. 3A–3C are converted to analog form by the decoder shown in FIG. 2B.

Inasmuch as it is expected that some sub-bands will not be active in every master frame, without other arrangements a dequantizer filter pair would not receive a signal for that master frame. This lack of signal does not represent lack of activity in the associated frequency spectrum for that port, it represents a lack of change in the signal. Accordingly, the signalling control and demultiplexing equipment 201 may include an 8-bit storage register for each sub-band. For each frame, any active signal for that particular sub-band is written into the register. Any master frame in which no signal is received for that particular sub-band, the register output is coupled to the associated dequantizer-filter to maintain the appropriate output. This latter feature is, of course, quite common in TASI and VAC equipments.

Although FIGS. 2A and 2B are illustrated in the form of discrete logic elements, those skilled in the art will be aware that the invention can be implemented using random logic, and actually that implementation is preferred, as described in Esteban et al. Typical devices with which the invention is implemented include signal processors which are now commercially available. For example, INTEL and Nippon Electric Co. signal processors have a memory access time in the range of 100 to 300 nanoseconds.

Figure 4:
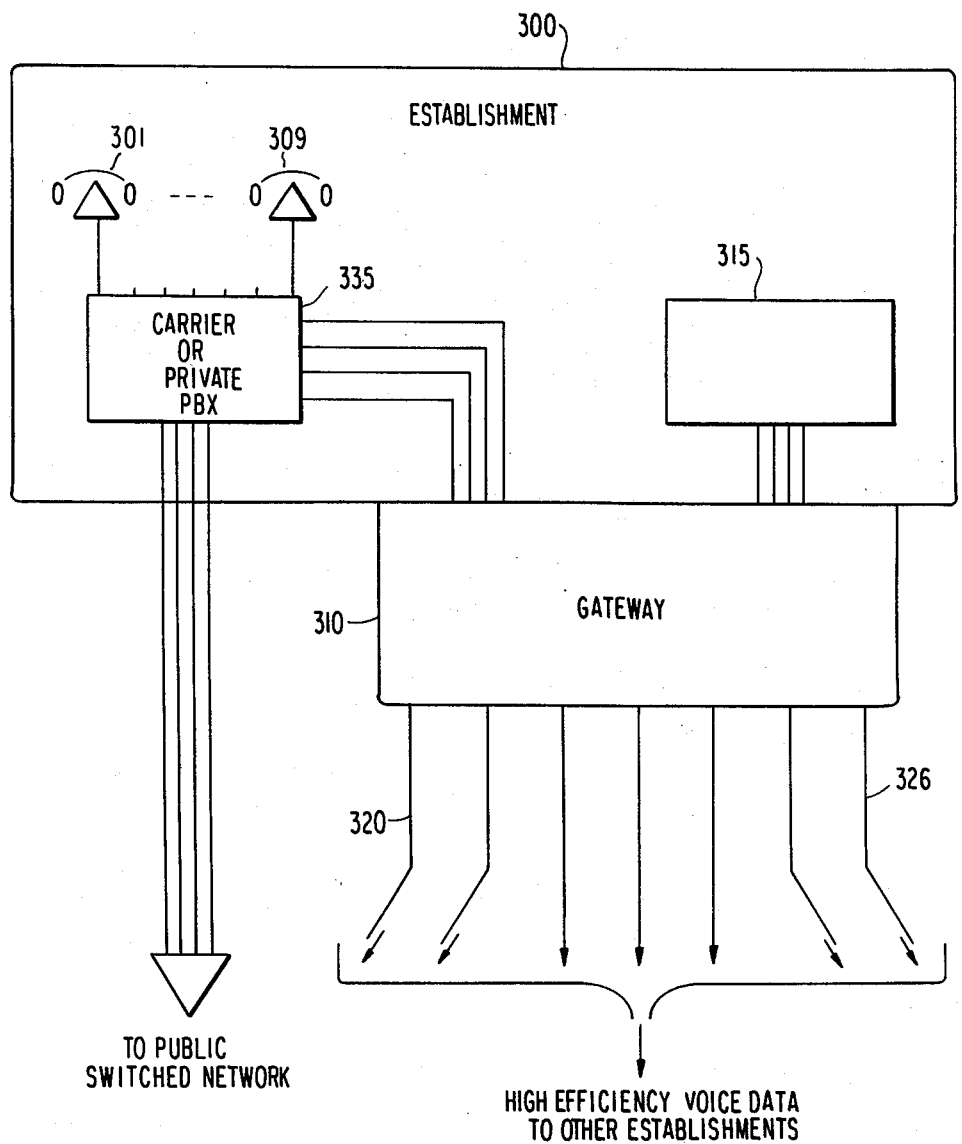
FIGS. 4 and 5 are block diagrams illustrating incorporation of the invention for practical application.
Figure 5:
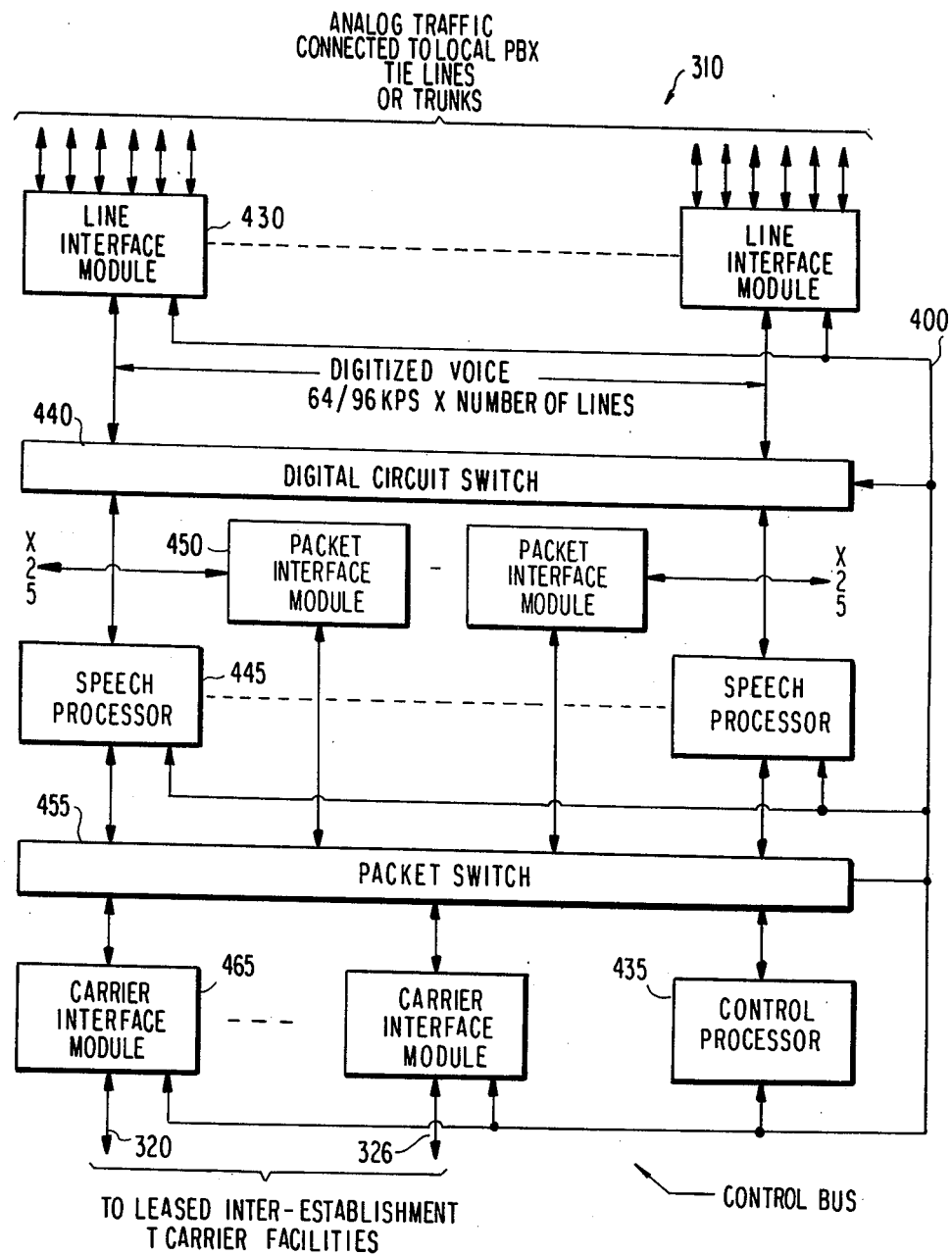

FIGS. 4 and 5 illustrate the manner in which the invention can be used to improve communication channel efficiency.

As shown in FIG. 4, a plurality of signal sources are provided at a location 300 which is interconnected, through the public switched network, and is also interconnected via private communication channels to other similarly equipped locations. More particularly, the location 300 includes a plurality of voice signal sources such as telephones 301 through 309 connected to carrier or private PBX equipment 335. The private PBX equipment 335 is coupled to the public switched network. In addition, another output of the private PBX 335 is coupled to the private channel gateway equipment 310. The location 300 also includes a plurality of data sources shown diagrammatically at 315, and these are also connected to the gateway 310. The gateway 310 is coupled to high efficiency voice/data communication channels 320 through 326. The gateway equipment 310 is shown in more detail in FIG. 5.

As shown in FIG. 5, the gateway equipment 310 interconnects to one or more telephone trunks via line interface module 430. The line interface module 430 converts the trunk signalling (call addressing, disconnect, etc.) to digital messages which are passed along to a control processor 435 via the shared channel 400. The action taken by the control processor 435 is described below. Signalling messages from the control processor are converted via the line interface to the protocol required by the connected trunk. The voice signals received at the line interface module from the analog telephone trunks are digitally coded. While many different codes could be employed, 64 Kbps companded PCM or 96 Kbps linear PCM is suggested. In the reverse direction, digital signals received by the gateway equipment 310 for eventual transmission to an analog trunk are converted from the PCM code to analog signals in the line interface modules 430 (the manner in which the digital signals achieve the PCM coding is described hereinafter). The analog-to-digital and digital-to-analog conversions are accomplished with LSI components readily available on the market. For the case of digital trunks interconnected to the line interface module 430, the incoming signal may be converted to PCM, if necessary. Correspondingly, outgoing signals are converted from the PCM code to the trunk's code. Signalling messages from a digital trunk are converted to an internal protocol and handled by the control processor 435. Signalling messages to the digital trunk are converted from the internal protocol to the trunk's protocol. If desired, several different types of line interface modules 430 can match the desired types of trunks presented to the gateway equipment 310 from for example PBX, central office or subscriber loop.

With the voice signal now converted to PCM form, the line interface passes the now digital signals to the digital circuit switch 440. The digital circuit switch 440 is arranged to couple the now digital signals to an available speech processor, for example speech processor 445. The digital circuit switch 440 passes signals in both directions. The same is true for speech processor 445 (i.e it implements both split-band encoding and decoding. It can receive PCM from the line interface module and re-encode that information in accordance with the invention described above, and pass it along to the communication facility. In the opposite direction, the speech processor receives the split band encoded data from the communication facility, and produces PCM digital signals which are coupled to the digital switch 440 to the line interface module 430. The actual paths used at any time through the digital switch are established by the control processor 435. A particular implementation for the digital switch 440 is for example a time slot interchange switch.

To maximize the efficiency with which the communication facility is employed, the gateway equipment 310 also includes ports for connection to digital data circuits. For example, an X 0.25 interface is shown as an example. Other interfaces are possible to serve other protocols. The packet interface module, such as packet interface module 450 receives data from any connected circuit and buffers it until transmission capacity is available to the required destination. As each frame is transmitted via the communication facility, the selected packet interface module such as module 450 supplies data bits to occupy the residual frame capacity. Data received via the communication facility is buffered by the packet interface module 450 until the full packet is received. On complete reception, the packet is sent out over the attached digital circuit. The size of the packet may vary from a single character to an entire data block depending on the data protocol in use on the digital circuit. Implementation of a packet interface module 450 is available via any one of several microprocessor configurations.

The speech processor 445 may receive digitized speech from a digital circuit switch 440 wherein the digital signals are recoded using the split band encoding technique described above. This process produces a digital output rate proportional to the requirements of the speech signal. In the gateway equipment 310, the coded output is packetized or blocked and presented to the packet switch 455. In the reverse direction, digital speech received by the network is decoded or reconstructed to a PCM format and presented to the digital circuit switch 440 for connection to the appropriate line interface module 430. The speech processor 445 can be implemented via a unique digital signal processing logic or via a programmed signal processor. After reviewing this description though, those skilled in the art will be capable of that implementation.

The packet switch 445 presents the blocks of coded speech and packet data to a carrier interface module which is carrier interface module 460. Blocks of coded speech data from the communication facility are also communicated to the speech processor 445 for decoding into PCM format. Data received from the communication facility during each frame is handled by the packet switch 455 and coupled to an appropriate packet interface module 450. Routing of coded speech data and other digital data through the packet switch 455 is controlled by the control processor 435.

The carrier interface module, such as carrier interface module 465 is connected to each of the high speed digital facilities. Coded speech blocks to be transmitted over the facility are assembled into a frame for transmission. The available bits are assigned as required by the aggregate of the signals to be transmitted. Residual bits are used to transmit data traffic. The high speed programmed microprocessor configuration can implement the carrier interface module 465.

The control processor 435, as has been described, handles call setup, disconnect and routing through the gateway equipment. The control processor 435 can be implemented using any of several micro or mini computers.

While the gateway equipment 310 is considered an effective implementation of the invention, those skilled in the art will understand that it is one of the advantages of the invention that it can be implemented effectively for relatively small numbers of input ports, in significant contrast to the prior art. When the invention is implemented in those circumstances, the substantial amount of switching, for example, the digital circuit switch 440 and packet switch 455 may well be omitted along with the corresponding functions required by their presence from the control processor 435.

We claim:

1. A statistical multiplexer including a plurality of input ports wherein each of said input ports has a split band encoder and each of said split band encoders is provided with a plurality of encoder elements, means for allocating to each encoder element of each of said split band encoders a bit allocation determined by comparing a signal in said element with signals in all of the elements of all split band encoders coupled to said input ports.

2. The apparatus of claim 1 wherein:
   each split band encoder element comprises a filter and quantizer,
   and wherein said signal in said element comprises an output of said filter.

3. The apparatus of claim 1 wherein said means for allocating includes:
   power level measurement means for measuring power in each said signal in said element with an output coupled to a bit allocation means,
   a bit allocation means responsive to said output of said power level measurement means for distributing a fixed bit capacity among all said encoder elements in accordance with power measurements effected by said power level measurement means, and
   means coupling a bit allocation for each encoder element to a quantizer in said encoder element.

4. The apparatus of claim 3 which further includes a signalling, control and multiplexing device responsive to an output of each quantizer and to bit allocations effected by said bit allocation means for concatenating in time outputs of all said quantizers.

5. The apparatus of claim 2 in which each port further includes:
   power measurement means responsive to signals at an output of each filter for producing a sub-band power measure signal,
   comparator means for comparing sub-band power measure signals with a predetermined threshold,
   logic means responsive to outputs of said comparator means for developing a logic signal level of one or another type, and
   gating means with one input coupled to said input port and another responsive to quantizer outputs for coupling to an output of said gating means, one of said inputs based on said logic signal level, whereby:
   said split-band encoding is bypassed for port input signals producing one of said logic signal levels.

6. The apparatus of claim 5 in which said logic means producing said one type of logic signal if, and only if, said comparator means indicates each sub-band power measure exceeds said threshold.

7. A statistical multiplexer capable of operating with a relatively small number of input ports and exhibiting a relatively small freeze out factor for the number of input ports, comprising:
   a split band encoder for each of said ports, each of said port encoders including a plurality of encoder elements for encoding each port's input in a bit length determined by a common control means,
   common control means responsive to signals in each said encoder element for allocating thereto a bit count capacity related to the relative signals in all said encoder elements of all said ports, and multiplexing means for concatenating outputs of all said encoding elements.

8. The apparatus of claim 7 in which said common control means includes:
  power means for each port for producing a signal indicative of power in each sub-band over a block and for summing said signals to produce a port sum power signal,
  global bit allocation means responsive to each of said port sum power signals to allocate a portion of a fixed bit count to each of said ports,
  port bit allocation means responsive to sub-band power signals to allocate among sub-bands of said port the port's allocated bit count.

9. The apparatus of claim 8 in which said power means produces said signal indicative of power in each sub-band over a block based on maximum sub-band amplitude within said block.

10. A multiport split band encoding digital multiplexer with n ports, comprising:
  a plurality of n encoders, each associated with one of said ports, each said encoder comprising:
  a plurality of m filters, whre m is an integer greater than 1, each of said m filters with an input connected to the associated port, and an output,
  a plurality of m quantizers, each connected to a different one of said filter outputs, for quantizing said filter output in a variable bit word,
  and a common control including:
  bit allocation means separately responsive to each said filter output for assessing the relative power level of each filter output versus the total power of all said filter outputs, and on the basis of said assessment for allocating none or some of a pool of bit capacity to each of said quantizers, and
  multiplexing means for concatenating in time the quantized outputs of all said quantizers.

11. The multiplexer of claim 10 wherein said common control includes:
  power measurement means for each port, each said power measurement means assessing filter output power for each associated filter and producing a filter power signal and an indication of all power signals,
  global bit allocation means responsive to each port's indication of filter power signal for allocating a port bit capacity to each port based on relations between all said indications, local bit allocation means for each port for allocating port bit capacity among associated quantizers based on said filter power signals.

12. The multiplexer of claim 11 wherein said power measurement means assesses filter power based on filter output amplitude.

13. The multiplexer of claim 11 wherein each port includes:
  power measurement means responsive to said filter outputs for assessing power in each filter output,
  comparator means for comparing filter power assessment with a fixed threshold,
  logic means responsive to said comparator means, and
  gating means for blocking quantizer outputs in response to a selected one of two possible outputs of said logic means.

* * * * *